(12) United States Patent
Shin et al.

(10) Patent No.: US 9,170,054 B2
(45) Date of Patent: Oct. 27, 2015

(54) COOLING TOWER FILL

(71) Applicant: Baltimore Aircoil Company, Inc., Jessup, MD (US)

(72) Inventors: Yoon K. Shin, Ellicott City, MD (US); Richard H. Harrison, Easton, MD (US); Raymond Charlton, Baltimore, MD (US); Kevin Egolf, Hampstead, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 259 days.

(21) Appl. No.: 13/955,767

(22) Filed: Jul. 31, 2013

(65) Prior Publication Data
US 2015/0034277 A1  Feb. 5, 2015

(51) Int. Cl.
*B01F 3/04* (2006.01)
*F28D 1/02* (2006.01)

(52) U.S. Cl.
CPC ................... *F28D 1/0206* (2013.01)

(58) Field of Classification Search
CPC .................................................. F28D 1/0206
USPC .............................. 261/112.1, 112.2, DIG. 11
See application file for complete search history.

(56) References Cited

U.S. PATENT DOCUMENTS

| | | | | |
|---|---|---|---|---|
| 3,260,511 | A | * | 7/1966 | Greer .......................... 261/112.2 |
| 3,281,307 | A | * | 10/1966 | Moeller et al. ................ 428/179 |
| 3,540,702 | A | * | 11/1970 | Uyama ....................... 261/112.2 |
| 3,733,063 | A | * | 5/1973 | Loetel et al. ............... 261/112.2 |
| 3,775,234 | A | * | 11/1973 | Rich ............................. 428/183 |
| 3,963,810 | A | * | 6/1976 | Holmberg et al. .......... 261/112.2 |
| 4,344,899 | A | * | 8/1982 | Monjoie ..................... 261/112.2 |
| 4,548,766 | A | | 10/1985 | Kinney, Jr. et al. |
| 4,670,197 | A | * | 6/1987 | Stackhouse ................. 261/112.2 |
| 4,800,047 | A | * | 1/1989 | Monjoie ..................... 261/112.2 |
| 5,413,872 | A | * | 5/1995 | Faigle ........................... 428/603 |
| 6,206,350 | B1 | | 3/2001 | Harrison et al. |
| 6,869,066 | B2 | | 3/2005 | Koo |
| 7,491,325 | B2 | * | 2/2009 | Kulick et al. ................. 210/150 |

FOREIGN PATENT DOCUMENTS

JP         2-4196     *  1/1990

* cited by examiner

*Primary Examiner* — Charles Bushey
(74) *Attorney, Agent, or Firm* — Edward J. Brosius

(57) ABSTRACT

A fill sheet for use in a fill arrangement in a direct heat exchange section of a cooling tower is provided. Each fill sheet includes ridges, grooves, separators, that improve the performance of the fill sheet arrangement when installed as a direct heat exchange section of a cooling tower. The separators are located in minor air paths between the fill sheet to improve the air flow capabilities and performance of the direct heat exchange section.

22 Claims, 6 Drawing Sheets

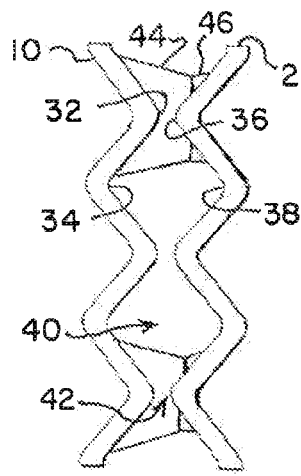
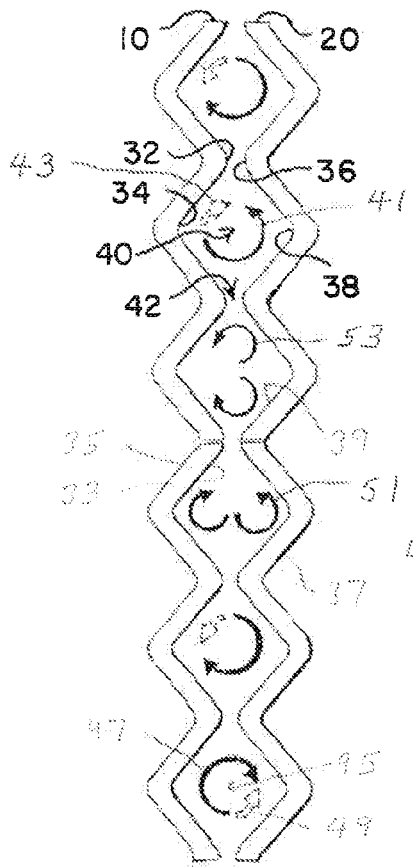
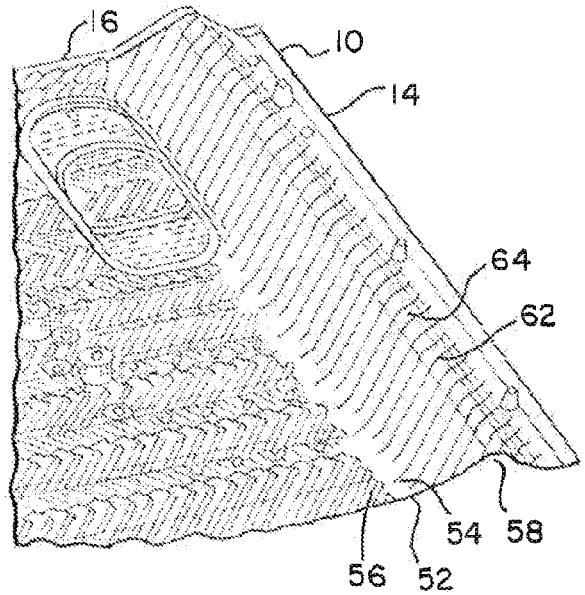
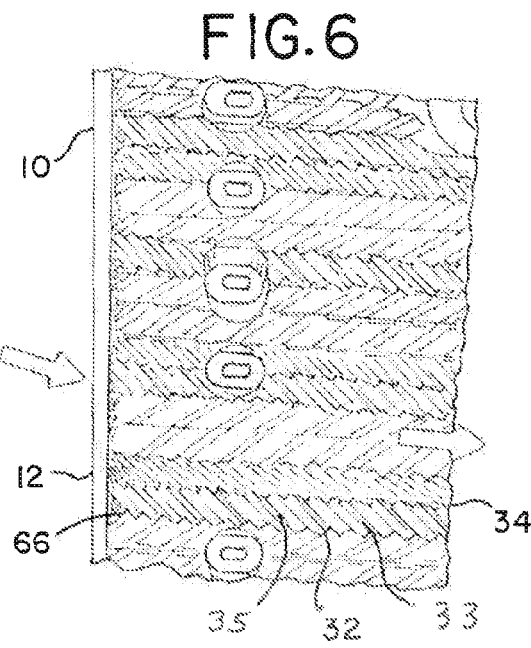

COOLING TOWER FILL

BACKGROUND OF THE INVENTION

The present invention relates to a heat and mass transfer media, or fill sheet arrangement, utilized within the direct heat exchange portion of a cooling tower. More particularly, the present invention relates to a fill sheet for use in a direct heat exchange unit, which could be a cooling tower.

The heat and mass transfer media, or fill sheet arrangement, is generally vertically oriented with an evaporative liquid, usually water, coursing over the material, usually flowing downwardly, with an air stream directed usually transversely but potentially concurrent or cross current through the spaced fill sheet direct cooling section. The air interacts with the evaporative liquid for heat and mass transfer.

SUMMARY OF THE INVENTION

The heat and mass transfer media, or fill sheet arrangement, of the present invention enhances the thermal efficiency of the direct heat exchanger by providing adjacent sheets of fill that define air flow channels. Such air flow channels are especially efficient due to the utilization of both male and female separators on adjacent fill sheets, that are located outside major air paths between the fill sheets. Each fill sheet is comprised of a series of ridges and grooves, with major air paths located between the rear surface of a first fill sheet groove and the front surface of an adjacent second fill sheet groove. Minor air paths are located between the rear surface of a first fill sheet ridge and the front surface of an adjacent second fill sheet ridge. By placing the separators in the minor air path, improved flow of air and accordingly improved heat and transfer in the direct heat exchanger are provided.

In major air paths located between the rear surface of a first fill sheet groove and the front surface of an adjacent second fill sheet groove, angled raised sections and angled lowered sections nudge air to spin in various ways as air traverses through the media and increase heat and mass transfer rate. Other improvements associated with the first fill sheet and adjacent second fill sheet in the direct heat exchanger in accordance with the present invention include a transition zone located between the plurality of ridges and grooves of each fill sheet and an outlet side edge of each fill sheet for air to exit the fill sheet arrangement. Such transition zone reduces the amount of evaporative liquid from reaching the mist eliminator which is typically adjacent the second or outlet side edge of the fill sheet arrangement.

Another improvement associated with the fill sheet arrangement of the present invention is an air inlet louver zone adjacent the air inlet or first side edge of the fill sheet arrangement. Each fill sheet includes an air inlet louver zone comprised of a plurality of gradually raised surfaces that lead to form the raised ridges of each fill sheet.

BRIEF DESCRIPTION OF THE DRAWINGS

In the drawings,

FIG. 3 is a schematic view of a portion of a first fill sheet adjacent a second fill sheet in accordance with an embodiment of the present invention;

FIG. 4 is a schematic view of a portion of a first fill sheet adjacent a portion of a second fill sheet in accordance with an embodiment of the present invention;

FIG. 5 is a partial view of a first fill sheet showing a transition zone and mist eliminator in accordance with an embodiment of the present invention;

FIG. 6 is a partial view of a first fill sheet showing an air inlet louver zone in accordance with an embodiment of the present invention;

FIG. 10A is a schematic view of a portion of a first fill sheet adjacent a portion of a second fill sheet in accordance with an embodiment of the present invention;

DESCRIPTION OF THE PREFERRED EMBODIMENT

Figure 1:
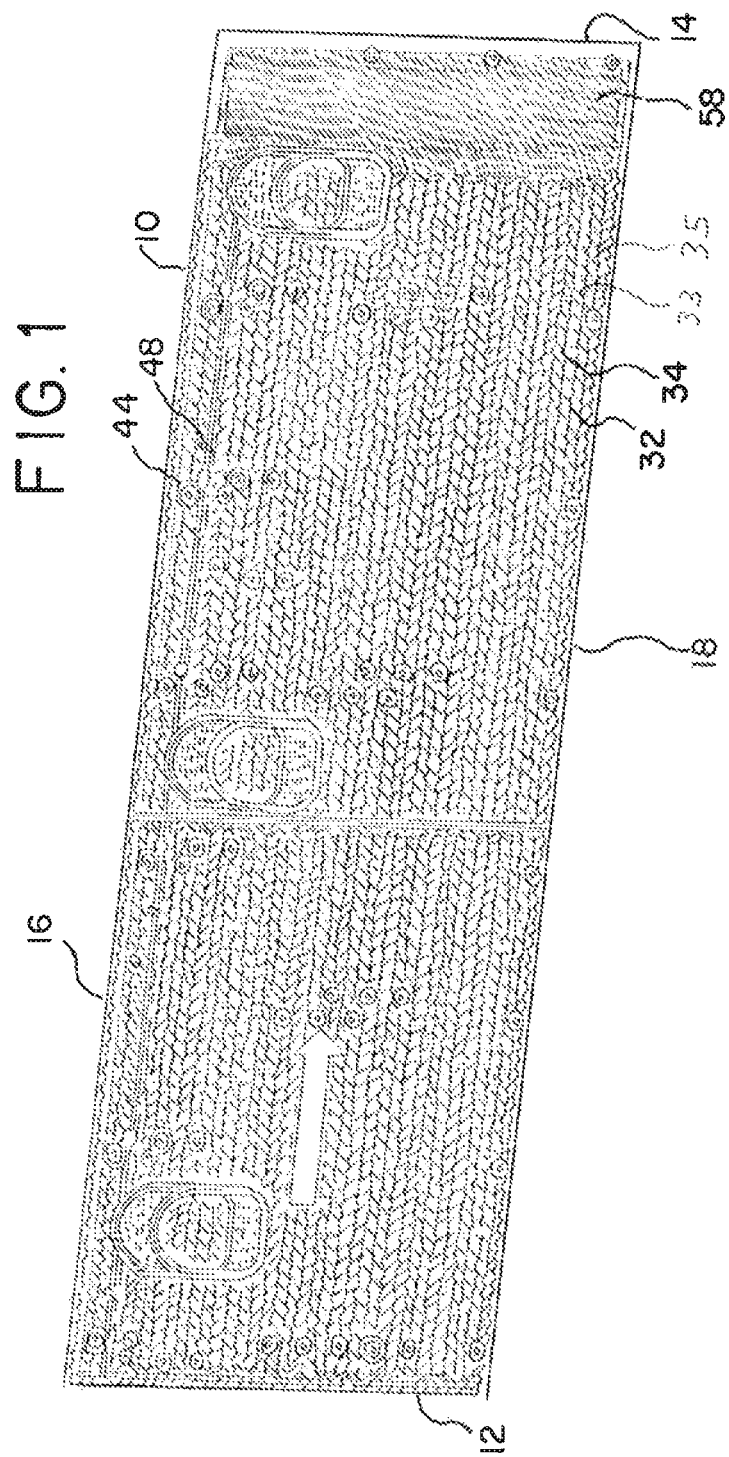
FIG. 1 is a side view of a first fill sheet in accordance with an embodiment of the present invention.

Referring now to FIG. 1 of the drawings, a first fill sheet is shown at 10. First fill sheet 10 is shown to be of a generally rectangular and generally planar structure; however, it should be understood that based on design of installation needs first fill sheet 10 may be of a square or trapezoidal structure as well. First fill sheet 10 is seen to comprise a top edge 16, bottom edge 18, first side edge 12, and second side edge 14. Generally, when installed in a direct heat exchange unit, possibly as a component of a cooling tower, evaporative liquid, usually water, flows downwardly onto top edge 16 and across first fill sheet 10, and exits bottom edge 18. First side edge 12 is typically an air inlet edge wherein air is forced or drawn cross-current to the evaporative liquid downward flow to exit from second side edge 14. Such combination of evaporative liquid down flow and cross-current air flow acts to remove heat from the evaporative liquid by both a heat and mass transfer operation. It should be understood that air flow may be somewhat counter current or con-concurrent with the evaporative liquid downward flow, depending on the design of the direct heat exchange unit.

Each first fill sheet 10 is usually comprised of polyvinyl chloride, polypropylene, or any other plastic sheet formed in a press, vacuum forming, or molding operation. Mist eliminator 58 is seen to be located inside second side edge 14 of first fill sheet 10. First fill sheet mist eliminator 58 acts to keep evaporative liquid from exiting or at least any significant amount of evaporative liquid from exiting from second side edge 14, and helps to keep the major flow of evaporative liquid downwardly across first fill sheet 10.

First fill sheet 10 is also seen to comprise ridges 32 extending length wise from first side edge 12 to second side edge 14. Alternating with first fill sheet ridges 32 are first fill sheet grooves 34, which also extend lengthwise across first fill sheet 10 from first side edge 12 to second side edge 14.

First fill sheet 10 is also seen to comprise a first male separator 44 which extends upwardly from the surface of first fill sheet 10. As to be further explained, first male separator 44 is typically located on first fill sheet ridge 32 on the rear surface of first fill sheet 10.

First fill sheet 10 rear surface is seen such that each ridge includes a series of angled raised sections 33 that angle upwardly from an edge of ridge 32 facing top edge 16 and have a differing concurrent angle from the edge of first fill sheet ridge 32 facing bottom edge 18. Adjacent each raised section 33 is a lowered section 35 which has a similar angled arrangement to each adjacent raised section 33.

Figure 2:
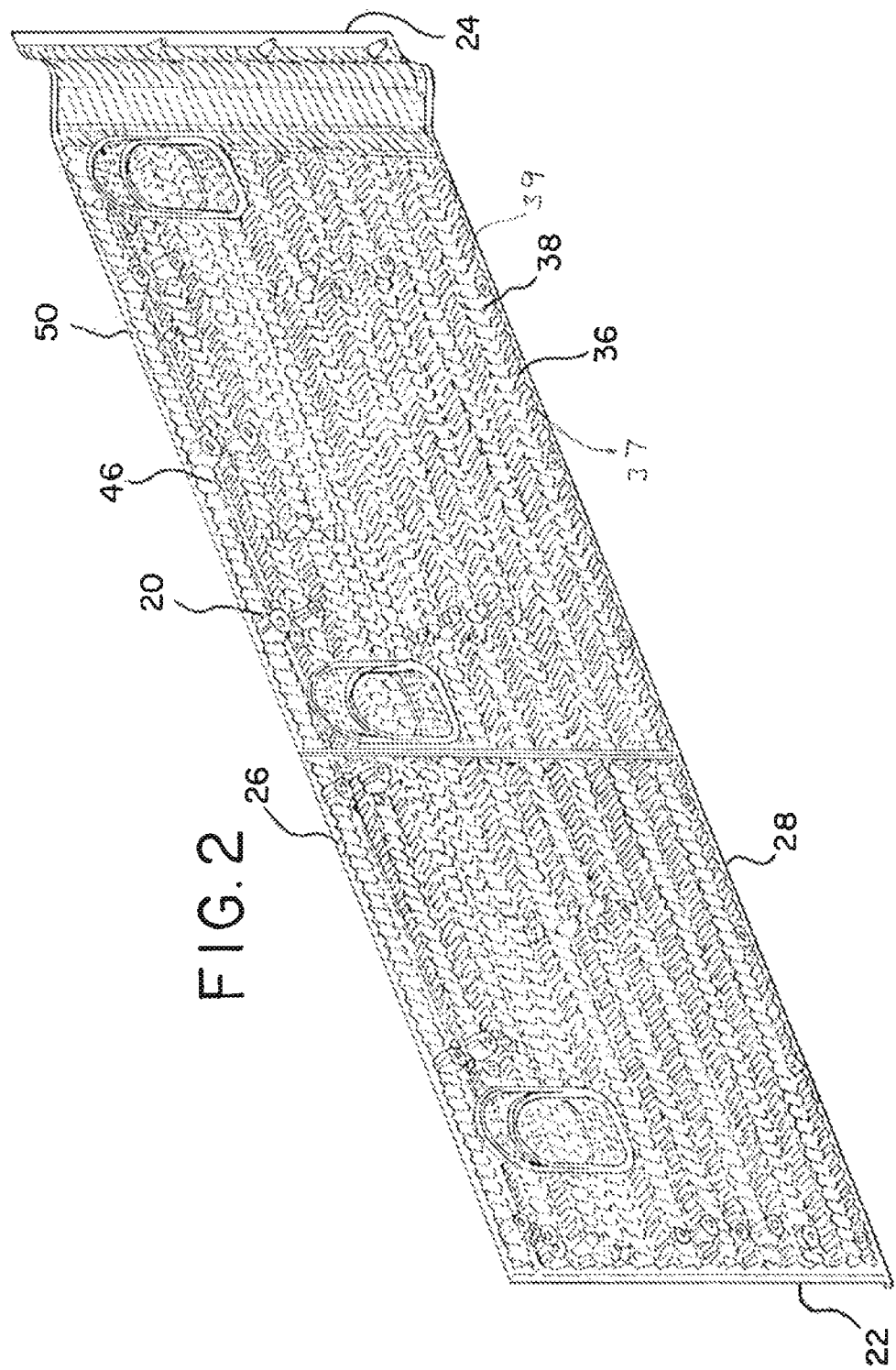
FIG. 2 is a perspective side view of a second fill sheet in accordance with an embodiment of the present invention.

Referring now to FIG. 2, second fill sheet 20 is seen to be quite similar to first fill sheet 10 in that second fill sheet 20 also is a generally rectangular, generally planar structure, having top edge 26, bottom edge 28, first side edge 22 and second side edge 24.

Second fill sheet 20 is again quite similar or identical to first fill sheet 10 there to in being comprised of polyvinyl chloride, polypropylene, or any other plastic sheet made in a pressing, vacuum forming, or molding operation. Further, second fill sheet 20 is seen to comprise a second fill sheet ridge 36 on the front surface of second fill sheet 20 and second fill sheet and adjacent second fill sheet grooves 38 on the front surface of second fill sheet 20. Second fill sheet 20 is also seen to comprise first female separators 46 which are generally present on a second fill sheet ridge 36, with similar second fill sheet second female separators 50. As to be further explained, first fill sheet first male separator contacts second fill sheet first female separator, with the first fill sheet first male separator 44 extending from the rear surface of first fill sheet 10 and the second fill sheet first female separator 46 being present on the front surface of second fill sheet 20. Similarly, first fill sheet second male separators 48 contact extend from the rear surface of first fill sheet 10 and contact second fill sheet second female separator 50 located on the second fill sheet front surface. Second fill sheet 20 is similarly seen to have a series of ridges extending lengthwise from first side edge 22 to second side edge 24, and an adjacent series of second fill sheet grooves 38 also extending lengthwise from first side edge 22 to second side edge 24.

Second fill sheet 20 front surface is seen such that each ridge includes a series of angled raised sections 37 that angle upwardly from an edge of ridge 36 facing top edge 26 and have a differing concurrent angle from the edge of first fill sheet ridge 36 facing bottom edge 28. Adjacent each raised section 37 is a lowered section 39 which has a similar angled arrangement to each adjacent raised section 37.

In practice, a fill arrangement in a direct heat exchange unit would be comprised of two fill sheets located adjacent each other and repeat multiple times as needed. Referring now to FIG. 3 and FIG. 4, schematics are shown wherein a portion of first fill sheet 10 is seen to be adjacent a portion of second fill sheet 20. First fill sheet first male separator 44 is seen to extend from first fill sheet ridge 32 on the rear surface of first fill sheet 10 toward second fill sheet ridge 36 on the front surface of second fill sheet 20. First fill sheet first male separator 44 is seen to contact second fill sheet first female separator 46 and create a designed spacing between first fill sheet 10 and second fill sheet 20 when installed as part of a fill arrangement in a direct heat exchanger. It should be noted that major air path 40 is formed between first fill sheet groove 34 on the rear surface of first fill sheet 10 and second fill sheet groove 38 formed on the front surface of second fill sheet 20. Similarly, minor air path 42 is formed between first fill sheet ridge 32 on the rear surface of first fill sheet 10 and second fill sheet ridge 36 on the front surface of second fill sheet 20. It can thusly be seen that first fill sheet first male separator 44 extends into minor air path 42 in its contact with second fill sheet first female separator 46. Such positioning of first fill sheet first male separator 44 and second fill sheet first female separator 46 act to keep major air path 40 clear for less impingement on air flow from the inlet edge of the adjacent first fill sheet 10 and second fill sheet 20 with additional fill sheets formed as part of a fill sheet arrangement outwardly toward the second side edge 14 of first fill sheet 10 and second side edge 24 of second fill sheet 20, with such second side edges also deemed an air outlet edge of the fill arrangement.

Referring to FIG. 4 of the drawings, In major air paths located between the rear surface of a first fill sheet groove and the front surface of an adjacent second fill sheet groove, first fill sheet 10 rear surface has angled raised section 33 and adjacent lowered section 35 and second fill sheet 20 front surface has angled raised section 39 and adjacent lowered section 37. As air travel in the direction from first side edge 12 to second side edge 14 in FIG. 1, angled raised sections 33 and 39 and respective lowered sections 35 and 37 cause air to spin in helical manner. In major air path 40 the ratio of number of angled raised section 33 and 39 and angled lowered section 35 and 37 causing air to spin counterclockwise direction to number of angled raised section 33 and 39 and angled lowered section 35 and 37 causing air to spin clockwise direction is 3 to 1. With three times more angled raised and lowered sections turning air traveling from first side edge 12 to second side edge 14 counterclockwise than angled raised and lowered sections turning air clockwise, primarily air spins ¾ turn in counterclockwise direction 41 and ¼ turn in clockwise direction 43. In adjacent major air path 45 air spins ¾ turn in direction 47 and ¼ turn in direction 49. Secondarily air spins in double helices 51 or 53.

Referring now to FIG. 5 of the drawings, a detailed view of a portion of first fill sheet 10 near second side edge 14 is shown. First fill sheet mist eliminator 58 is shown as a raised, curved section adjacent second side edge 14. First fill sheet mist eliminator 58 is seen to be comprised of a series of angled raised sections 62 with adjacent lowered sections 64. Such mist eliminator 58 assists in keeping the vast majority of evaporative liquid flowing downwardly across fill sheet 10 from exiting second side edge 14.

Also referring to FIG. 5 first fill sheet transition zone 52 is seen as extending from top edge 16 to bottom edge 18 and comprises a change from first fill sheet ridges 32 and first fill sheet grooves 34 to first fill sheet mist eliminator 58. In particular, first fill sheet transition zone 52 is comprised of a series of transition zone raised ribs 54 and depressed channels 56, of a larger spacing than mist eliminator raised section 62 and mist eliminator lowered section 64. Such transition zone 52 assists in keeping the vast majority of evaporative liquid from exiting side edge 14 of first fill sheet 10.

It should be understood and describing mist eliminator 58 and transition zone 52 with regard to first fill sheet 10, that each fill sheet present in the fill sheet arrangement would include such transition zone 52 and mist eliminator 58.

Referring now to FIG. 6, a detailed section of first fill sheet 10 is shown adjacent first side edge 12. A louver zone 66 is shown between first side edge 12 and first fill sheet ridges 32 and first fill sheet grooves 34. Such louver zone is comprised of a gently rising area, that generally corresponds to each first fill sheet ridge 32. Such louver zone aides in a smooth distribution of air that is drawn inwardly across first side edge 12.

Figure 7:
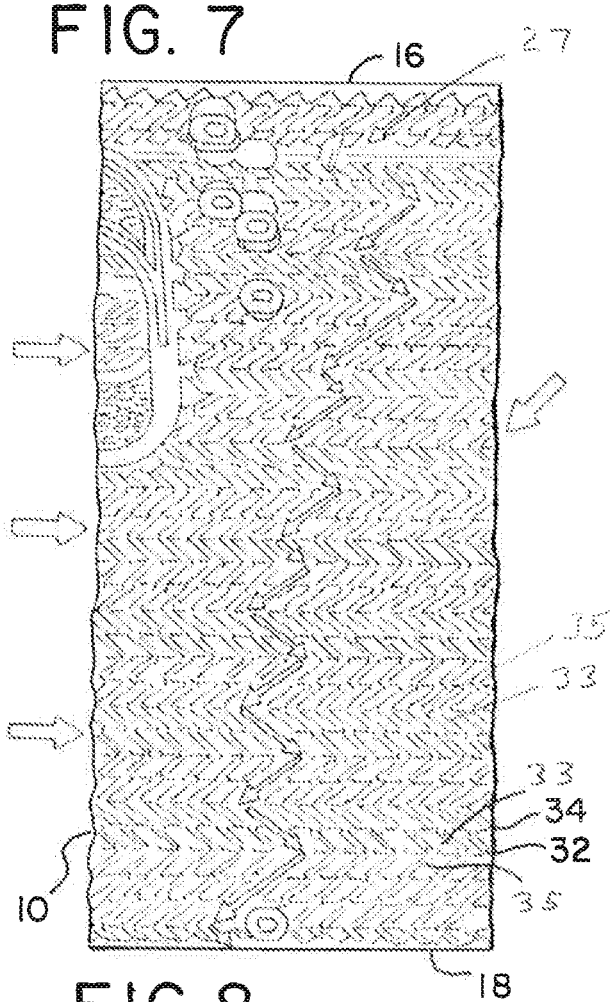
FIG. 7 is a partial view of a first fill sheet showing the ridges and grooves along with the raised sections and adjacent lowered section of the ridges and grooves in accordance with an embodiment of the present invention.

Referring now to FIG. 7, first fill sheet 10 is shown as comprising first fill sheet ridges 32 that extend lengthwise from near first side edge 12 to the first fill sheet transition zone 52. First fill sheet rear surface which is shown in FIG. 7 is seen such that each ridge includes a series of angled raised sections 33 that angle upwardly from an edge of ridge 32 facing top edge 16 and have a differing concurrent angle from the edge of first fill sheet ridge 32 facing bottom edge 18. Adjacent each raised section 33 is angled lowered section 35 which has a similar angled arrangement to each adjacent raised section 33.

It should be noted that an angled lowered section 35 that start at top edge 16 is connected to another angled lowered section and continues until bottom edge 18 is reached. An example of connected angled lowered section 27 shows majority of angled lowered section 35 is angled forward.

Figure 8:
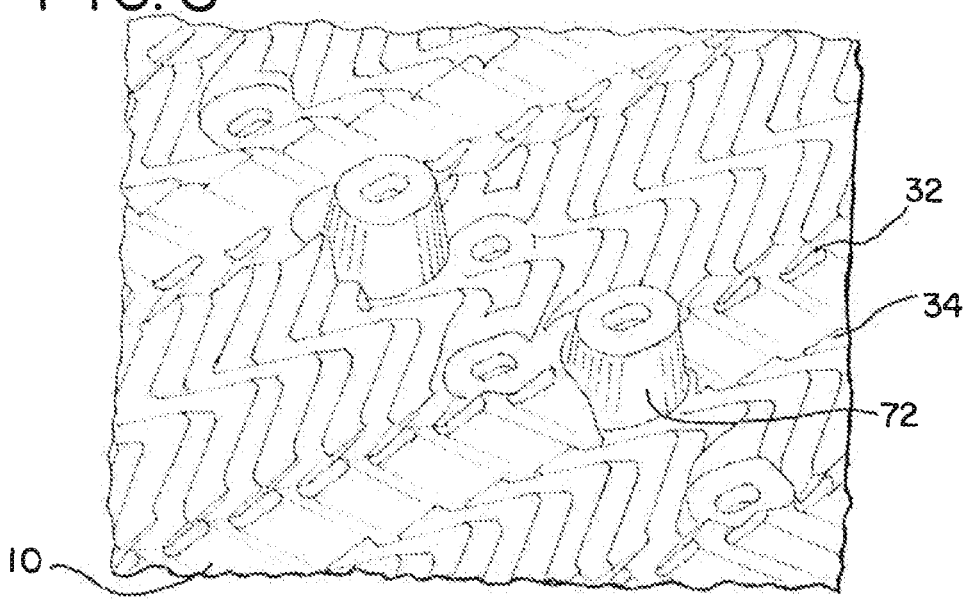
FIG. 8 is a partial perspective view of a first fill sheet showing male and female separators in accordance with an embodiment of the present invention.

Referring now to FIG. 8, a detailed view of first fill sheet 10 rear surface is shown as including male separator 72 extending upwardly from the generally planar rear surface of first fill sheet 10. It should also be seen that male separators 72 extend from first fill sheet ridges 32. Such placement of male separators 72 assure that such male separators extend into a minor air path as shown in FIG. 3.

Figure 9:
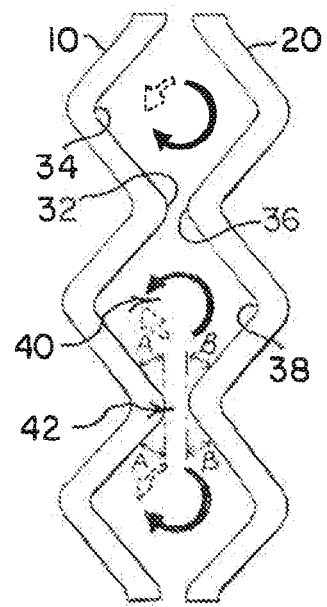
FIG. 9 is a schematic view of a portion of a first fill sheet adjacent a portion of a second fill sheet in accordance with an embodiment of the present invention.

Referring now to FIG. 9, a schematic view from first side edge 12 and second side edge 22 of a portion of first fill sheet 10 and a portion of second fill sheet 20 is shown. First fill sheet ridge 32 is shown on rear surface of first fill sheet 10. It is seen that angle A of the component section of first fill Sheet 10 extending from first fill sheet groove 34 to first fill sheet ridge 32 is at an angle A which is about 44 degrees from the vertical. Similarly, with regard to second fill sheet 20, the transition area extending from second fill sheet groove 38 on the front surface of second fill sheet 22 the second fill sheet ridge 36 is at an angle B which is about 44 degrees. Such angles are chosen to assure proper distribution and exposure of evaporative liquid falling downwardly across adjacent first fill sheet 10 and second fill sheet 20.

Referring now to FIG. 10A, a schematic view from top edge 16 of first fill sheet ridge 32 of a portion of first fill sheet 10 and second fill sheet ridge 36 of a portion of second fill sheet 20 is shown. It is seen that angle C of the component section of first fill sheet 10 extending from angled lower section 35 to angled raised section 33 is at an angle C which is between 20 and 30 degrees from fill plane 29 extending from top edge 16 to bottom edge 18. Similarly, it is seen that angle D of the component section of first fill sheet 10 extending from angled lower section 37 to angled raised section 39 is at an angle D which is between 20 and 30 degrees from fill plane 31 which extends from top edge 26 to bottom edge 28.

Figure 10:
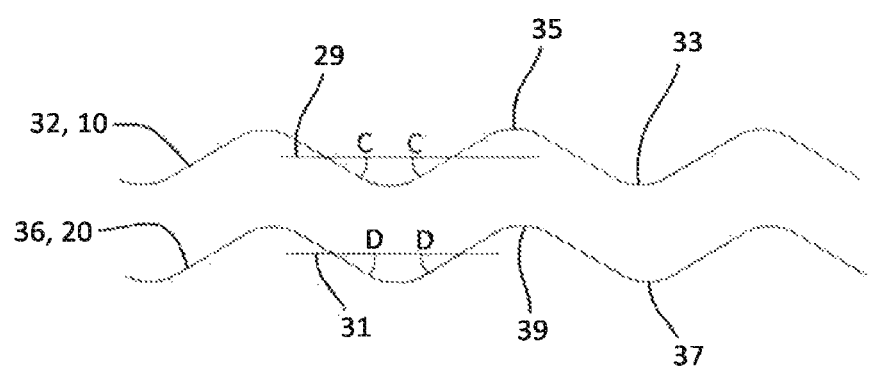
FIG. 10 is a partial perspective view of first fill sheet showing male and female indexers in accordance with an embodiment of the present invention.
Figure 10:
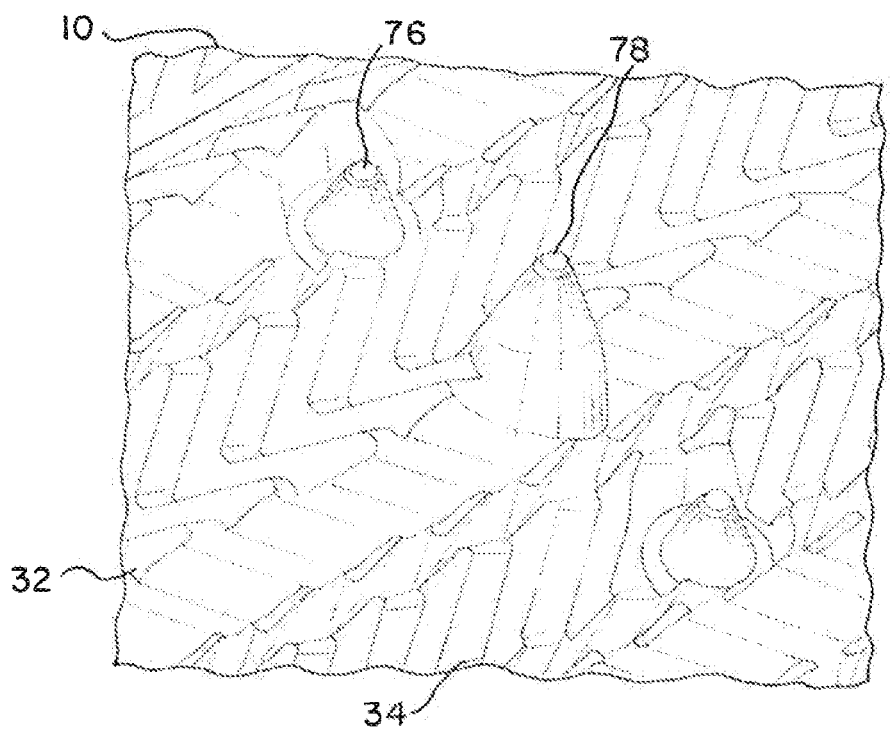

Referring now to FIG. 10, additional first fill sheet female indexer 76 is shown extending from a rear surface of first fill sheet 10 in an area of first fill sheet groove 34 and first fill sheet make indexer 78 is seen as extending from an area of first fill sheet ridge 32. Such female indexers 76 and male indexer 78 aide in spacing adjacent first fill sheet 10 and second fill sheet 20 along with additional similar fill sheets in a fill sheet arrangement.

Figure 11:
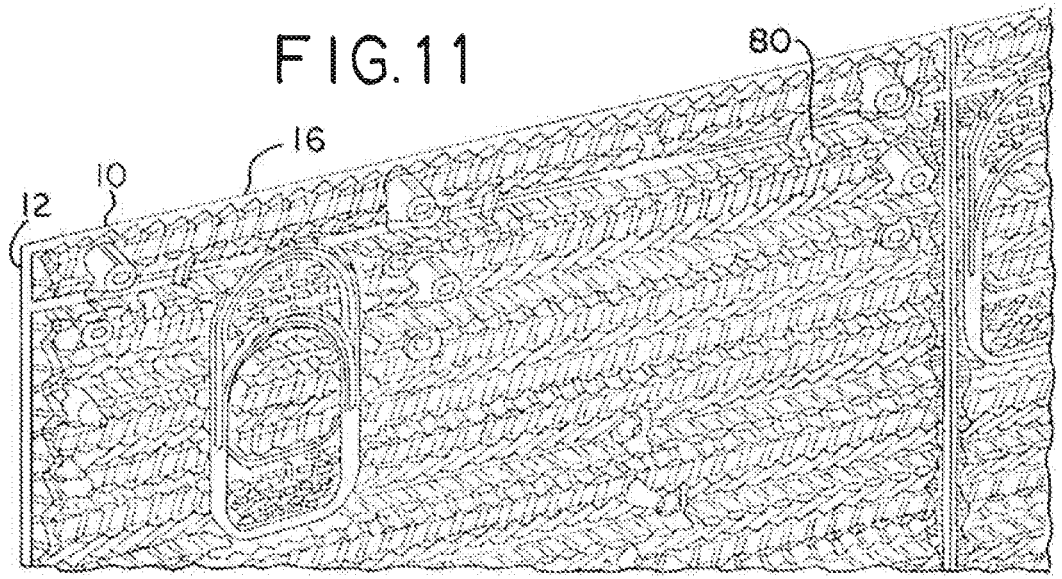
FIG. 11 is a partial side view of a first fill sheet showing tab separators in accordance with an embodiment of the present invention.

Referring now to FIG. 11, first fill sheet tab separators 80 are seen as extending upwardly from the generally planar surface of fill sheet 10. Such tab separators 80 assist in spacing fill sheet 10 from adjacent fill sheet 20 and other adjacent fill sheets in a fill arrangement in a direct heat exchanger.

What is claimed is:

1. A fill sheet arrangement for use in a direct heat exchanger,
   wherein a first fill sheet comprises a generally rectangular structure
      having a first side edge,
      a second side edge,
      a top edge, and
      a bottom edge,
   a front surface and a rear surface, and
   wherein a second fill sheet comprises a generally rectangular structure having a first side edge,
   a second side edge,
   a top edge and a bottom edge,
   a front surface and a rear surface, and
   the second fill sheet is adjacent the first fill sheet,
   the first fill sheet including a plurality of ridges and grooves,
   the second fill sheet including a plurality of ridges and grooves,
   wherein when the first fill sheet and
   the second fill sheet are adjacent in the direct heat exchanger,
   a ridge on the rear surface of the first fill sheet is adjacent a ridge on the front surface of the second fill sheet to form a minor air path, and
   a groove on the rear surface of the first fill sheet is adjacent a groove in the front surface of the second fill sheet to form a major air path, and
   wherein a first male separator extends from a ridge on the rear surface of the first fill sheet into the minor air path, and
   a first female separator is present on a ridge on the front surface of the second fill sheet, and
   the first male separator on the rear surface of first fill sheet contacts the first female separator on the front surface of the second fill sheet, wherein the first fill sheet includes a transition zone between the plurality of ridges and grooves and the second side edge,
   the transition zone comprising a plurality of raised ribs and adjacent channels.

2. The fill sheet arrangement of claim 1
   wherein a second male separator extends from a ridge on the rear surface of the first fill sheet into the minor air path, and
   a second female separator is present on a ridge on the front surface of the second fill sheet, and
   the second male separator on the rear surface of the second fill sheet contacts the second female separator on the front surface of the second fill sheet.

3. The fill sheet arrangement of claims 1
   wherein the first fill sheet includes a mist eliminator between the transition zone and the second side edge,
   the mist eliminator comprising a curved structure raised from the generally rectangular structure of the first fill sheet and including a plurality of raised sections and adjacent louvered sections.

4. The fill sheet arrangement of claim 1
   wherein the first fill sheet includes an air inlet louver zone adjacent the first side edge,
   the air inlet louver zone comprising a plurality of gradually round surfaces that lead to form the ridges of the first fill sheet.

5. The fill sheet arrangement of claim 1
   wherein the first fill sheet ridges on the rear surface of the first fill sheet includes a plurality of raised sections and adjacent lowered sections,
   wherein the raised sections and adjacent lowered sections of the ridge on the rear surface of the first fill sheet are angled from the fill sheet plane at an angle of between 20 and 30 degrees.

6. The fill sheet arrangement of claim 5
   wherein each of the ridges on the rear surface of the first fill sheet include the plurality of angled raised sections and adjacent angled lowered sections, and a majority of such angled raised sections and angled lowered sections are angled toward the first side edge of the fill sheet at an angle between 10 and 25 degrees from vertical.

7. The fill sheet arrangement of claim 1 wherein a portion of the fill sheet that extends between a ridge and a groove is at an angle of between 40 and 45 degrees from vertical.

8. The fill sheet arrangement of claim 1 wherein a male separator extends from a ridge on rear surface of each fill sheet the male separator extending into the minor air path,
and a corresponding female separator on a ridge in the front surface of the adjacent second fill sheet.

9. The fill sheet arrangement of claim 5 wherein the plurality of raised sections and adjacent lowered sections inside the majority of major air paths causes air traveling in the major air path to spin ¾ of one rotation in one direction and ¼ of one rotation in an opposite direction to improve heat and mass transfer between air and liquid.

10. The fill sheet arrangement of claim 5 wherein the plurality of angled raised sections and adjacent angled lowered sections inside the minority of major air paths causes air traveling in the major air path to spin in double helical manner to improve heat and mass transfer between air and liquid.

11. The fill sheet arrangement of claim 1 wherein fill sheet tab separators extending from a ridge of the rear face of the first fill sheet into the minor air path and mostly out the major air path, assist in spacing the first fill sheet and the adjacent second fill sheet.

12. A fill sheet arrangement for a heat exchanger comprising:
a first fill sheet having a generally rectangular,
generally planar structure with a first side edge,
a second side edge,
a top edge and a bottom edge,
a first surface and a rear surface, and
a second fill sheet having a generally rectangular,
generally planar structure with a first side edge,
a second side edge,
a top edge and a bottom edge,
a front surface and a rear surface,
and the second fill sheet is adjacent the first fill sheet,
the first fill sheet including a plurality of ridges and grooves,
the second fill sheet including a plurality of ridges and grooves,
a ridge on the rear surface of the first fill sheet adjacent a ridge on the front surface of the second fill sheet to form a minor air path, and a groove on the rear surface of the first fill sheet adjacent a groove on the front surface of the second fill sheet to form a major air path, and
wherein a first male separator extends from a ridge on the rear surface of the first fill sheet into the minor air path, and
a first female separator is present on a ridge on the front surface of the second fill sheet, and
the first male separator on the rear surface of first fill sheet contacts
the first female separator on the first surface of the second fill sheet, wherein the first fill sheet includes a transition zone between the plurality of ridges and grooves and the second side edge,
the transition zone comprising a plurality of raised ribs and adjacent channels.

13. The fill sheet arrangement of claim 12 wherein a second male separator extends from a ridge on the rear surface of the first fill sheet into the minor air path, and
a second female separator is present on a ridge on the front surface of the second fill sheet, and
the second make separator on the rear surface of the second fill sheet contacts the second female separator on the front surface of the second fill sheet.

14. The fill sheet arrangement of claim 13 wherein the first fill sheet includes a mist eliminator between the transition zone and the second side edge,
the mist eliminator comprising a curved structure raised from the generally planar structure of the first fill sheet and including a plurality of raised sections and adjacent lowered sections.

15. The fill sheet arrangement of claim 12 wherein the first fill sheet includes an air inlet louver zone adjacent the first side edge,
the air inlet louver zone comprising a plurality of gradually round surfaces that lead to form the ridges of the first fill sheet.

16. The fill sheet arrangement of claim 12 wherein the first fill sheet ridges on the rear surface of the first fill sheet includes a plurality of raised sections and adjacent lowered sections,
wherein the raised sections and adjacent lowered sections of the ridge on the rear surface of the first fill sheet are angled from the fill sheet plane at an angle of between 20 and 30 degrees.

17. The fill sheet arrangement of claim 16 wherein each of the ridges on the rear surface of the first fill sheet include the plurality of raised sections and
adjacent lowered sections, and
a majority of such raised sections and lowered sections are angled toward the first side edge of the fill sheet at an angle between 10 and 25 degrees from vertical.

18. The fill sheet arrangement of claim 12 wherein a portion of the fill sheet that extends between a ridge and a groove is at an angle of between 40 and 45 degrees from vertical.

19. The fill sheet arrangement of claim 12 wherein a male separator extends from a ridge on the rear surface of each fill sheet
the male separator extending into the minor air path, and
a corresponding female separator on a ridge in the front surface of the adjacent second fill sheet.

20. The fill sheet arrangement of claim 16 wherein the plurality of angled raised sections and angled adjacent lowered sections inside the majority of major air paths causes air traveling in the major air path to spin ¾ of one rotation in one direction and ¼ of one rotation in opposite direction to improve heat and mass transfer between air and liquid.

21. The fill sheet arrangement of claim 16 wherein the plurality of raised sections and adjacent lowered sections inside the minority of major air paths causes air traveling in the major air path to spin in double helical manner to improve heat and mass transfer between air and liquid.

22. The fill sheet arrangement of claim 12 wherein fill sheet tab separators extending from a ridge of the rear face of the first fill sheet into the minor air path and mostly out the major air path, assist in the spacing first fill sheet and the adjacent second fill sheet.

* * * * *